US005768597A

United States Patent [19]

Simm

[11] Patent Number: 5,768,597

[45] Date of Patent: Jun. 16, 1998

[54] SYSTEM AND METHODS FOR IMPROVED INSTALLATION OF COMPRESSED SOFTWARE PROGRAMS

[75] Inventor: Andrew Simm, San Jose, Calif.

[73] Assignee: Starfish Software, Inc., Scotts Valley, Calif.

[21] Appl. No.: 640,551

[22] Filed: May 2, 1996

[51] Int. Cl.$^{6}$ .......... G06F 9/44

[52] U.S. Cl. .......... 395/712; 395/685

[58] Field of Search .......... 395/712

[56] References Cited

U.S. PATENT DOCUMENTS

| | | | |
|---|---|---|---|
| 4,701,745 | 10/1987 | Waterworth | 341/63 |
| 5,051,745 | 9/1991 | Katz | 341/51 |
| 5,539,908 | 7/1996 | Chen et al. | 395/685 |

OTHER PUBLICATIONS

Simon, B., *Utilities: Squeeze Play*, PC Magazine, Oct. 15, 1991, pp. 291–320.

Melford, M., *Programming Utilities: Decompress Your .ZIP File Downloads with PCUNZIP.COM*, PC Magazine, Mar. 31, 1992, pp. 361–368.

Prosise, J., *Tutor: Understanding Data Compression*, PC Magazine, May 25, 1993, pp. 305–308.

Simon, B., *Lab Notes: Lossless Compression: How It Works*, PC Magazine, Jun. 29, 1993.

*Primary Examiner*—Emanuel Todd Voeltz
*Assistant Examiner*—John Q. Chavis
*Attorney, Agent, or Firm*—John A. Smart

[57] ABSTRACT

A method is described for creating a self-extracting executable program by compressing an executable program into itself. In an exemplary environment, an executable program comprises the code, data, and resources. The code comprises one or more code segments. The data comprises one or more data segments. The resources comprise one or more resources for the program, such as menus, icons, bitmaps, strings, dialogs, user-defined resources, and the like. One or more code segments from code are transferred to the self-extracting executable program such that its code section comprises one or more uncompressed code segments—that is, the original code segments taken from the code section of executable program. Similarly, one or more data segments from the data section of the executable program are transferred to data section of the self-extracting executable program, as uncompressed data segment(s). Resources from the resource section of the executable program are transferred to the resource section. These are uncompressed resources (i.e., uncompressed by the compressor program). Other code, data, and/or resources of the executable program can be compressed into the program as follows. Code segments of the code section which are not initially needed (e.g., during installation) are compressed into the resource section, as compressed code segments. In a like manner, data from the data section is compressed into the resource section, as compressed data segments. In this manner, a program can be compressed into itself so that the program itself maintains control over its own decompression. The program is not compressed into non-executable data which is appended to an unrelated decompressor program.

20 Claims, 8 Drawing Sheets

120

SYSTEM AND METHODS FOR IMPROVED INSTALLATION OF COMPRESSED SOFTWARE PROGRAMS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of information processing and, more particularly, to apparatus and methods for improved installation of application programs and other software.

With each passing day, more and more software products are being marketed and distributed on-line. Because transmission speeds for communication networks are relatively slow, particularly for modem-based transmissions, there exists great interest in decreasing the size of software products, for decreasing the time and expense required for downloading these products to one's own computer. To this end, most vendors "compress" their products.

A multitude of compression algorithms exist in the marketplace today. Examples include, for instance, LZW, available from Unisys Corporation, and LZS, available from Stack Electronics. Perhaps better known are commercially available file compressors, such as PKZIP™, available from PKWare. Regardless of the particular compression algorithm employed, these compressors all function to generate an output which is smaller than the input. Complementing each particular compressor is a decompressor. A decompressor is a program which takes as its input a compressed file and generates as its output a restored (i.e., uncompressed) version of the original file.

Use of commercially available compressor/decompressor programs (hereinafter simply referred to as "compressors") for on-line software distribution has been problematic. In particular, existing implementations require that the compressors be run as separate programs apart from the program file or files which have been compressed. The end result has been that users must put up with a cumbersome installation procedures, including, for example, having to run command-line decompression utilities—ones which often employ arcane command-line switches.

In an effort to address the foregoing problem, many of the aforementioned compressors are available for creating "self-extracting files." For instance, PKZIP includes a separate utility, PK2EXE, which converts a "ZIP" file (i.e., a file compressed by PKZIP) into an executable program which, when run by the user, extracts the original file or files which have been compressed. Although these utilities simplify the procedure somewhat, installation still remains a chore for the user. Here, the decompression program is essentially "strapped onto" the archived file to produce the self-extracting file. Since the executable program file or files is not compressed within itself, there is limited ability to pass execution control from the decompression program back to the program file itself which has been compressed. As a result, the ability to control the installation process, including decompressing or unpacking other files, is limited.

What is needed are system and methods which allow a target program undergoing compression to be compressed into itself In this manner, the executable interface of the original program with the computer system is maintained. The present invention fulfills this and other needs.

SUMMARY OF THE INVENTION

According to the present invention, a method is described whereby a self-extracting executable program is created by compressing an executable program into itself. The technique can be extended to included also include other program objects, such as support files.

In an exemplary environment, such as one employing applications program executing under Microsoft Windows, an executable program comprises the code, data, and resources sections. The code comprises one or more code segments. The data comprises one or more data segments. The resources comprise one or more resources for the program, such as menus, icons, bitmaps, strings, dialogs, user-defined resources, and the like.

The process of creating a self-extracting executable program proceeds as follows. One or more code segments from code are transferred to the self-extracting executable program such that its code section comprises one or more uncompressed code segments—that is, the original code segments taken from the code section of executable program. Similarly, one or more data segments from the data section of the executable program are transferred to data section of the self-extracting executable program, as uncompressed data segment(s). Resources from the resource section of the executable program are transferred to the resource section. These are uncompressed resources (i.e., uncompressed by the compressor program).

Code, data, and/or resources of the executable program can be compressed into the program as follows. Code segments of the code section which are not initially needed (e.g., during installation) are compressed into the resource section, as compressed code segments. In a like manner, data from the data section is compressed into the resource section, as compressed data segments. Runtime decompression of those portions of the executable program which have been compressed is provided by decompressor library or routines which are "linked" into the self-extracting executable program, so that these reside in the uncompressed code segment(s) and data segment(s).

In this manner, a program can be compressed into itself so that the program itself maintains control over its own decompression. The program is not compressed into non-executable data which is appended to an unrelated decompressor program.

DETAILED DESCRIPTION OF A PREFERRED EMBODIMENT

The following description will focus on the presently preferred embodiment of the present invention, which is operative in an end-user application running under the Microsoft® Windows 3.x environment, which employs a segmented memory architecture (i.e., one in which programs can have multiple code and data segments). The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. For, a Microsoft® Windows95 embodiment, for example, a flat (non-segmented) memory architecture is employed. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
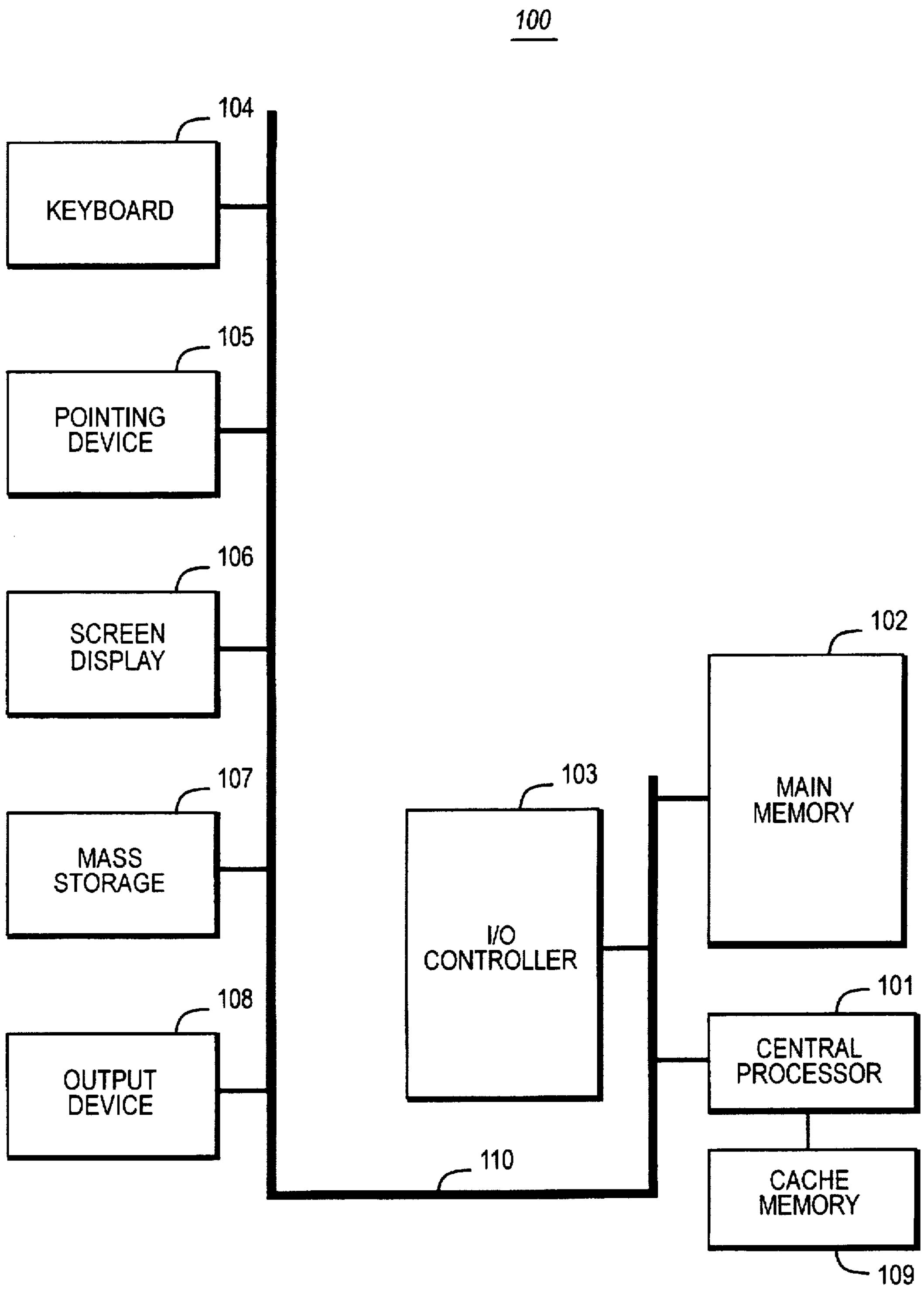
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 1B:
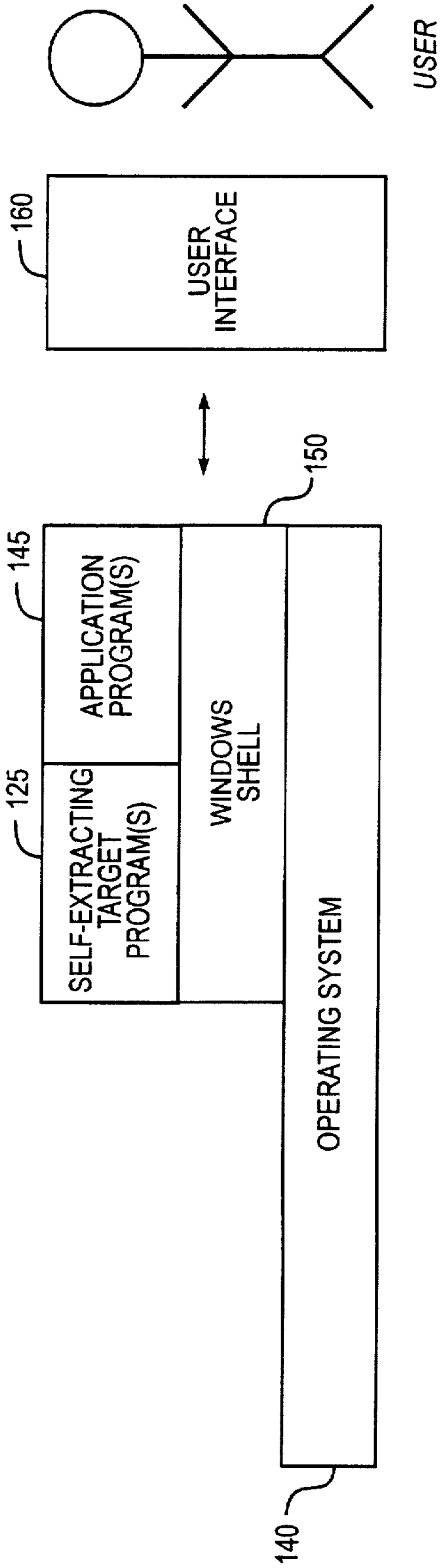
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on storage (e.g., disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 includes a user interface (UI) 160, preferably a Graphical User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application (s) 145, whereupon the user may supply additional inputs or terminate the session. In a preferred embodiment, OS 140 is MS-DOS and windows 145 is Microsoft® Windows; both are available from Microsoft Corporation of Redmond, Wash. Although shown conceptually as a separate module, the UI is typically provided by interaction of the application modules with the windows shell, both operating under OS 140.

One application software comprises a user interface shell 125. In an exemplary embodiment, Shell 125 comprises Dashboard® 95 (available from Starfish Software, Inc. of Scotts Valley, Calif.). A general description of the operation of Dashboard® 95 can be found in its accompanying user manual. Interface and methods provided by the present invention, in the exemplary embodiment of Dashboard® 95, will now be described in further detail.

Improved installation of software programs

Figure 2:
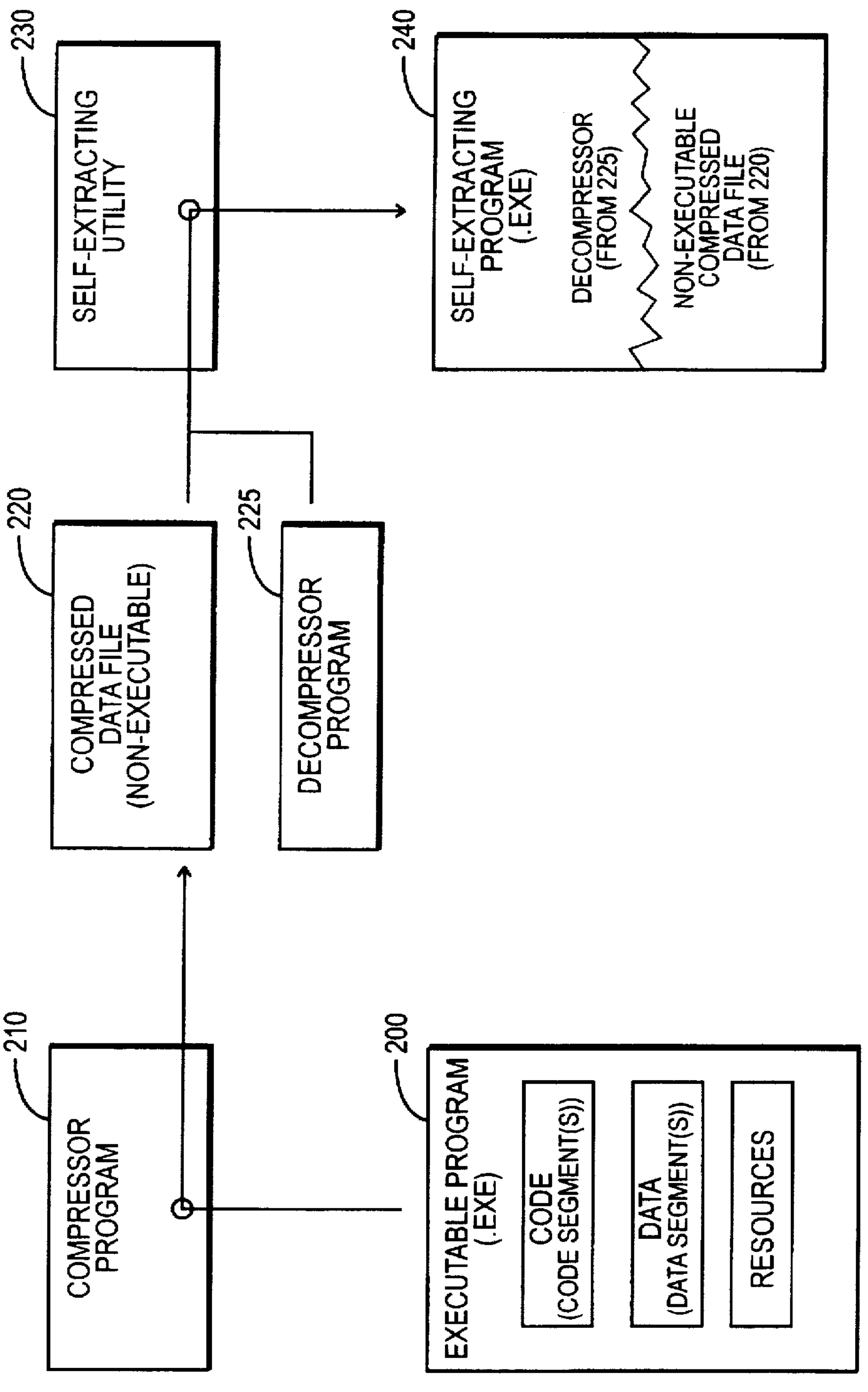
FIG. 2 is a block diagram illustrating a conventional approach to a self-extracting file.

With reference to FIG. 2, a conventional approach to a self-extracting file will be described. The general layout of a self-extracting file, such as a self-extracting "zip" file, is illustrated. As shown, a compressor program 210 takes as input a programmed file 200. Program file 200, before compression, exists as a stand-alone, fully-executable program. Typically, this is the target program which is really desired to be distributed to the end user. The program comprises defined sections which are of relevance herein.

In its original state, the program file 200 typically comprises program code (e.g., "code segments" for 16-bit Intel architecture) and program data (e.g., "data segments" for 16-bit Intel architecture). For a 32-bit embodiment, program code and data reside in a "flat" address space. For further description of the structure of a program running under Microsoft MS-DOS, see Duncan, R., *The MS-DOS Encyclopedia,* 1988, particularly Article 4: *Structure of an Application,* pp. 107–343. For a "Windows" application program, a third section is added: a resource section. The resource section of an application is employed to stored "Windows resources," including menus, bit maps, icons, and the like, for Windows applications. For further description of the structure of a program running under Microsoft MS-DOS, see Petzold, C., *Programming Windows,* Second Edition, Microsoft Press, 1990. The disclosures of each of the foregoing are hereby incorporated by reference.

Upon compression by the compressor program 210, the program file 200 is translated into a compressed data file 220. Note, particularly, that the internal structure of the program file 210 (i.e., code, data, and resources) is not maintained in a manner which may be used to directly operate the computer. Instead, the file is simply now a data file, typically comprising a compression dictionary followed by a stream of tokens indicating how dictionary entries are to be employed for reconstructing the original file. In other words, at this point, compression of the program file 210 has yielded a file which is not directly executable by the computer but, instead, has yielded a data file which must first be decompressed before further use. Here, the contents of the compressed data file (including compressed code, compressed data, and compressed resources) are known only to the decompressor.

As further shown in FIG. 2, a self-extracting utility 230 (e.g., PKWare's "ZIP2EXE") can be employed to create a self-extracting archive 240 from the compressed data file 220. Here, the self-extracting file 240 essentially comprises the compressed data file (shown at 245) simply coupled to the decompressor program 241. The self-extracting program 240 can be executed by the computer for decompressing the compressed data file. Note, however, that such an operation does not occur under the control of executable program 200. Instead, execution occurs under the decompressor program 25 which is imbedded within the self-extracting program 240. The approach is problematic.

During operation of the self-extracting program 240, none of the data structures or code (or resources) which comprise the executable program 200 are available. Instead, these components exist as compressed data which is only accessible for use after the compressed data file has been decompressed back into the executable program 200. Accordingly, the task of employing the self-extracting program is usually a two-step process. First, the user instructs the computer to execute the self-extracting program 240 which, in turn, generates the executable program 200. Next, the user manually instructs the computer to execute the executable program 200, which has just been decompressed.

Although the approach can be automated by having the self-extracting program "launch" the decompressed executable program 200, the approach is far from ideal. In particular, the approach only passes control to the executable program 200 after decompression has completed. The executable program 200 does not participate in the decompression/installation process. Instead, control is passed to the program only after the process has completed.

Figure 3:
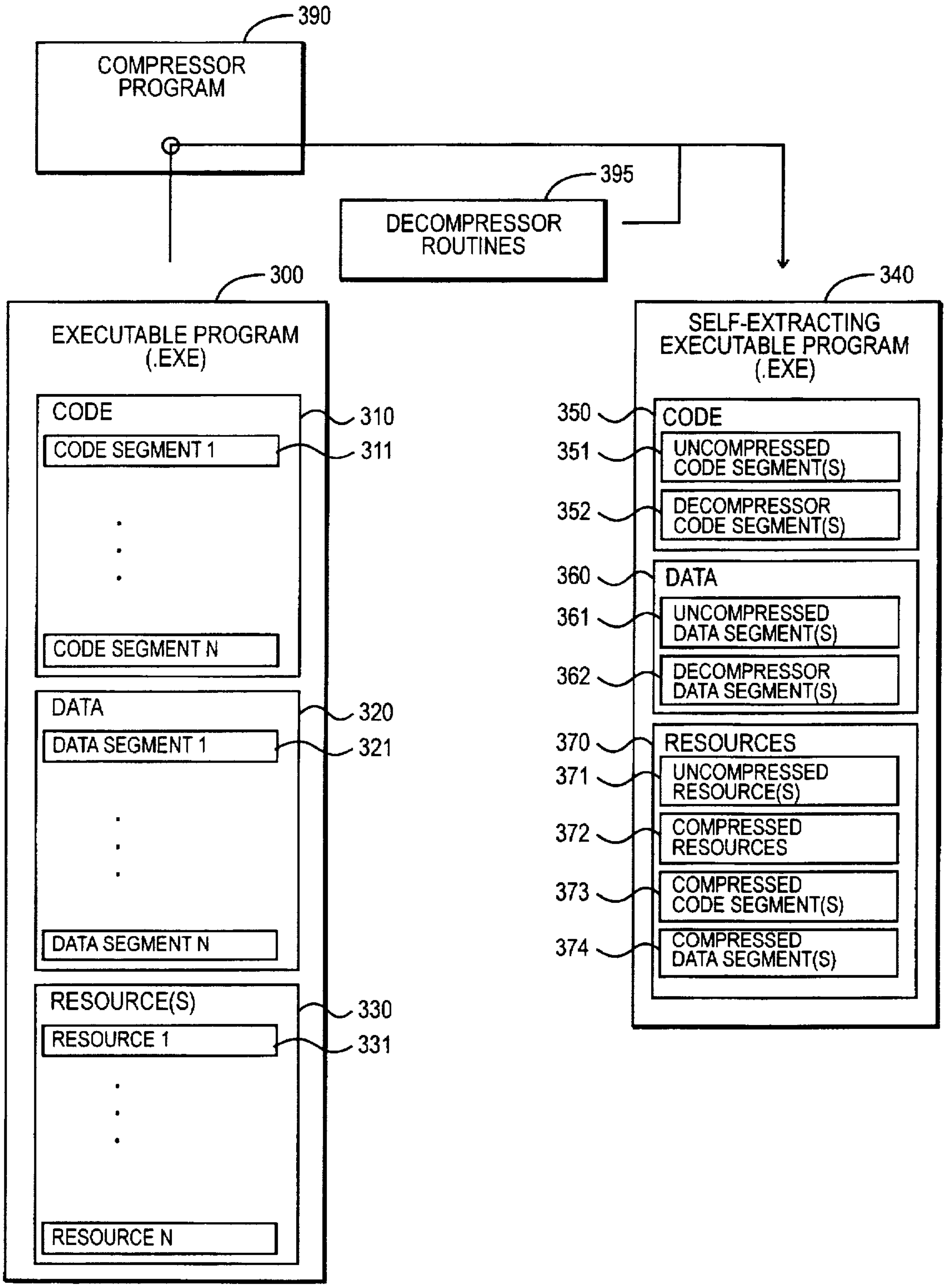
FIG. 3 is a block diagram illustrating an approach of the present invention for compressing an executable program into itself.

FIG. 3 illustrates an alternative approach to creating a self-extracting executable program: the approach of the present invention to compress an executable program into itself As shown, executable program 300 comprises the following sections: code 310, data 320, and resources 330. The code 310 comprises one or more code segments, such as code segment 311. The data 320 comprises one or more data segments, such as data segment 321. For a 32-bit embodiment (e.g., Windows NT), the multiple segments would be replaced by a single "flat" address space. Resources 330 comprise one or more resources for the program, such as resource 331. Compressor program 390 creates self-extracting executable program 340 as follows.

One or more code segments from code 310 (or simply code portions for a "flat" architecture) are transferred to the self-extracting executable program 340 such that its code section 350 comprises one or more uncompressed code segments 351—that is, code segments taken from the code section 310 of executable program 300. Similarly, one or more data segments from the data section 320 (or simply data portions for a "flat" architecture) of the executable program 300 are transferred to data section 360 of the self-extracting executable program 340. These are shown as uncompressed data segments 361. Resources from the resource section 330 of the executable program 300 are transferred to resource section 370. These are shown as uncompressed resources 371 (i.e., uncompressed by the compressor program 390).

Code, data, and/or resources of the executable program 300 can be compressed into the program as follows. Code segments of the code section 310 which are not initially needed (e.g., during installation) are compressed into resource section 370, as shown by compressed code segments 373. In a like manner, data from the data section 320 is compressed into the resource section 370, as shown by compressed data segments 374.

Runtime decompression of those portions of the executable program 300 which have been compressed is provided by decompressor library or routines 395. Suitable compression/decompression libraries are available from several vendors, including PKWare of Brown Deer, Wis. and Stac Electronics of San Diego, Calif. Here, the decompressor routines 395 are "linked" into the self-extracting executable program 340, as shown by decompressor code segments 352 and decompressor data segments 362. Although shown in separate code and data segments, the decompressor routines can be linked into the self-extracting executable program 340 so that code for decompression resides in the uncompressed code segment 351 and data for decompression resides in the uncompressed data segment 361. In this manner, a program can be compressed into itself so that the program itself maintains control over its own decompression. The program is not compressed into non-executable data which is appended to an unrelated decompressor program.

Figure 4A:
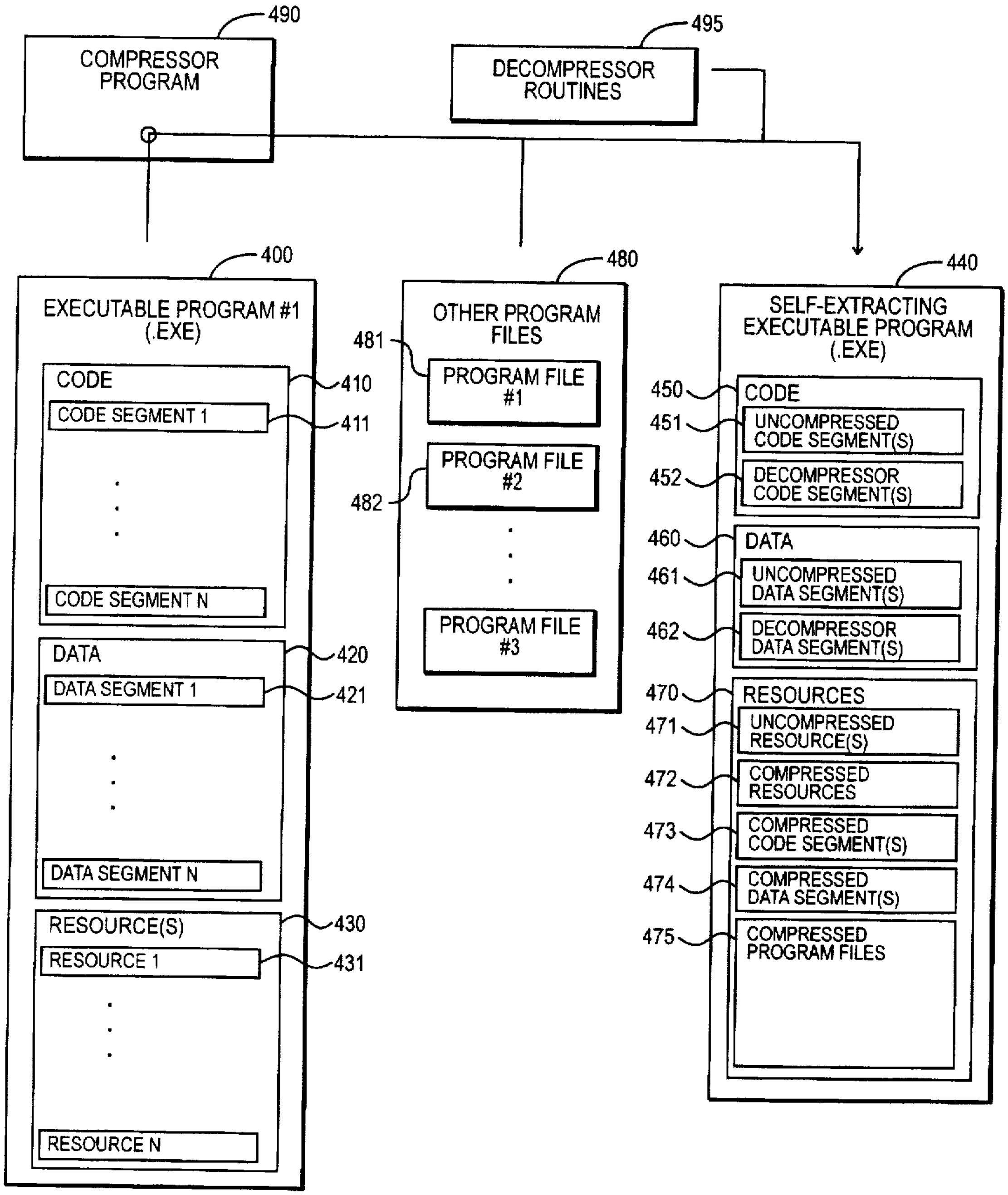
FIGS. 4A–B are block diagrams illustrating application of the approach of the present invention for compressing additional program files, including directory information.

FIG. 4A illustrates application of the approach of the present invention for compressing additional program files (e.g., support files), with creation of a self-extracting executable program 440 for the executable program 400. The executable program 400, in an uncompressed state, comprises code section 410 having one or more code segments 411, data section 420, having one or more data segments 421, and resource section 430, having one or more resources 431. In a manner similar described for FIG. 3, the code, data and resources which are not initially required are compressed into the resource section 470 of the self-extracting executable program 440. Uncompressed code for the executable program 400 is transferred to the uncompressed code segment 451. Uncompressed data for the executable program 400 is transferred to the uncompressed data segment 461. Uncompressed resources for the executable program 400 are transferred to uncompressed resources 471. To provide decompression capability, creation of the self-extracting executable program 440 includes linking with decompressor routines 495, for including decompressor code and data (shown as separate decompressor code segment 452 and separate decompressor data segment 462).

Figure 4B:
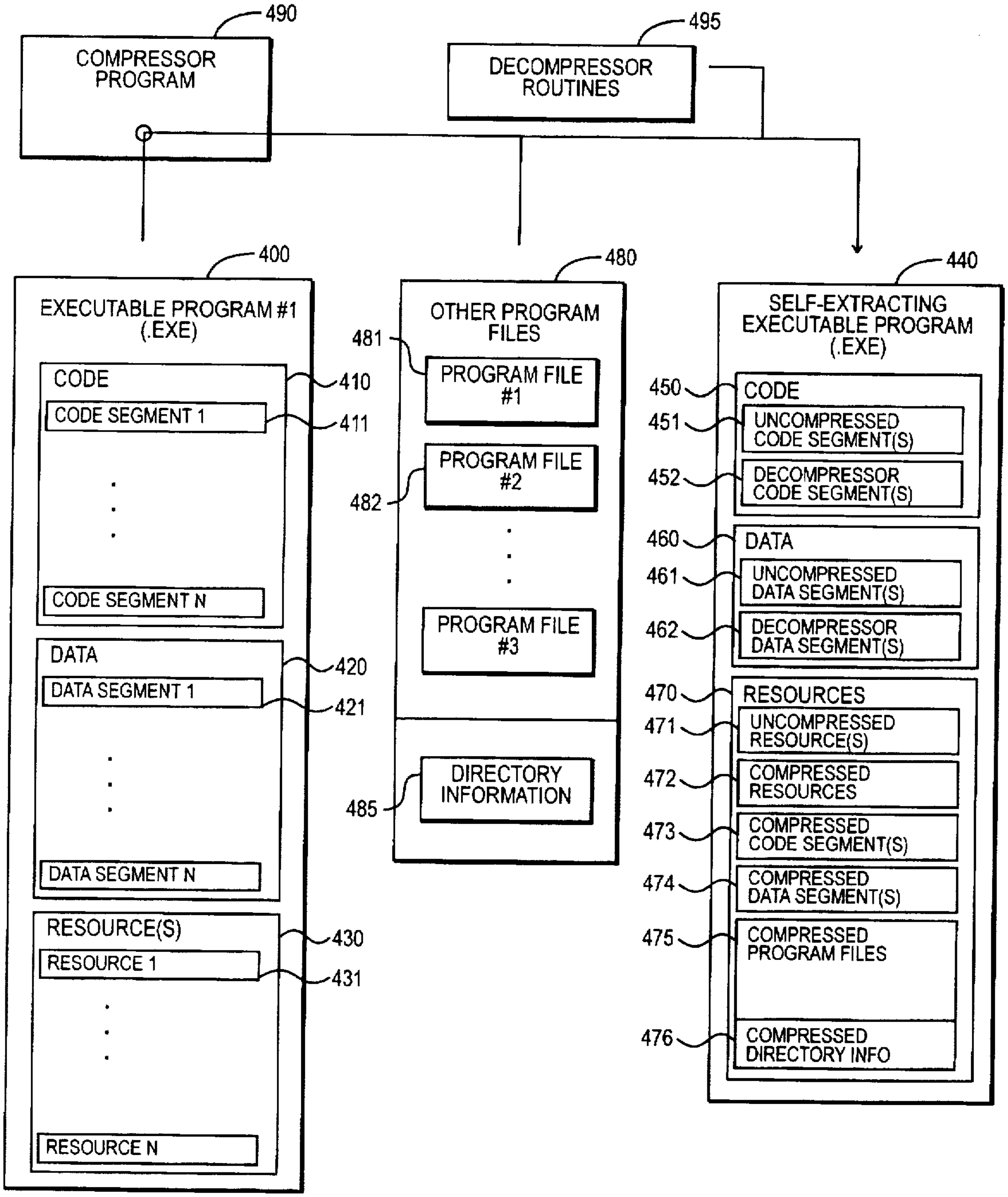

Other program files 480 can be compressed into the resource section 470 of self-extracting executable program 440. For instance, program file 481 and program file 482 can be compressed into compressed program files 475. During execution of the self-extracting executable program 440, the program files can be restored to an uncompressed state as needed. As shown in FIG. 4B, compression of program files 480 may include directory information 485 for specifying a directory structure or layout (i.e., logical structure on a storage device) for restoring the program files 480.

Figure 5A:
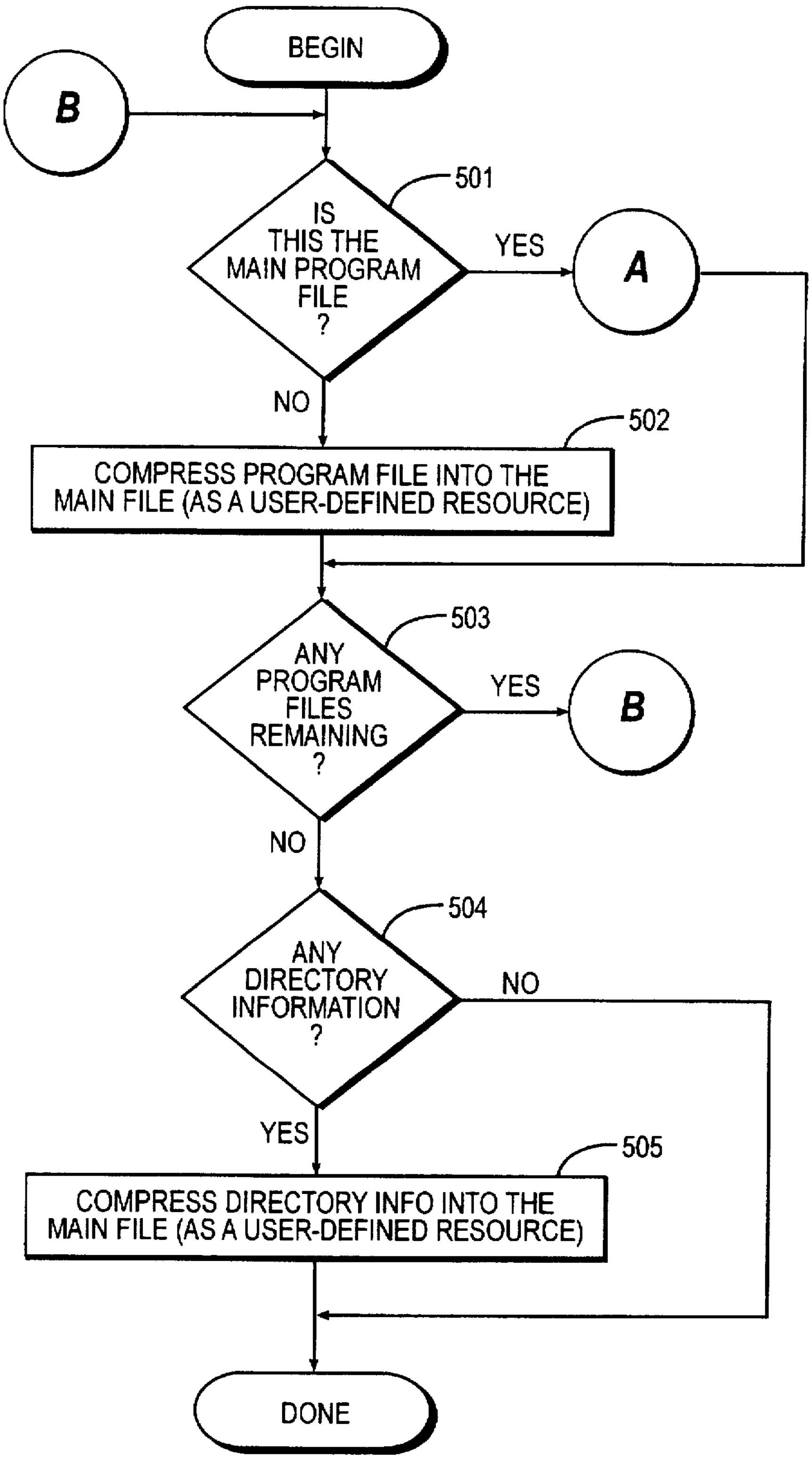
FIGS. 5A–B are flowcharts illustrating a method of the present invention for creating a self-extracting executable program.
Figure 5B:
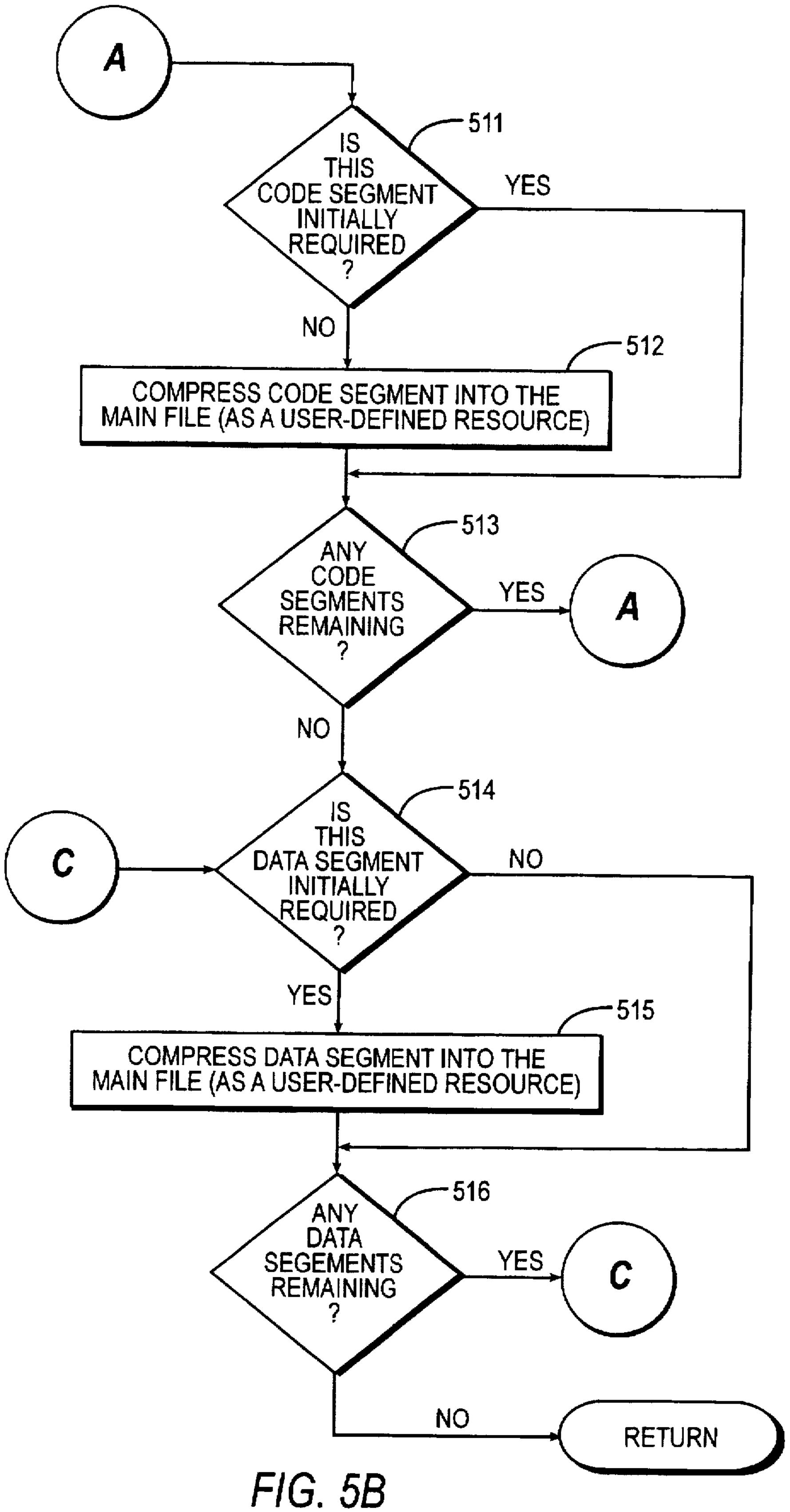

Referring now to FIGS. 5A–B, a method of the present invention for creating a self-extracting executable program is illustrated. The steps are as follows. At step 501, a loop is established to test whether the current file being compressed is the "main" program file—that is, the program file which is to maintain control during the installation/decompression process. If the current file is not the main program file ("no" at step 501), the method proceeds to step 502 to compress the program file into the main file as a user-defined resource stored in the resource section. Otherwise ("yes" at step 501), the method proceeds to step 511.

At step 511, the method determines whether the current code segment is initially required—that is, should remain uncompressed. If "no" at step 511, the code is compressed into the main file as a user-defined resource, at step 512. Otherwise, step 512 is skipped. At step 513, the method tests whether any other code remains to be processed. If "yes" at step 513, the method loops back to step 511. Otherwise, the method continues to step 514.

Steps 514–516 entail a similar analysis as was performed at steps 511–513, except that steps 514–516 examine program data instead of code. After all data segments have been processed, control returns to step 503. At that step, the method loops back to step 501 if further program files remain to be processed. Otherwise (i.e., "no" at step 503), all program files have been processed. At steps 504–505, any directory information for the files can be (optionally) included. Although not shown as a separate step, decompression code and data would be "linked in", for completing the self-extracting executable file.

Decompression proceeds by restoring compressed portions from the user-defined resource. In an embodiment operative under Microsoft Windows, for example, the user-defined resource can be decompressed as follows. First, the user-defined resource, stored as a "PAQ file," is located within the resource section of the program.

```
// Get a handle on this executable file.
HMODULE hMod = GetModuleHandle(NULL);
if (!hMod)
  return FALSE;
// Locate the compressed portions within the application's resources
HRSRC hSrc = FindResource(hMod, "IDR_QFILE", "PAQFILE");
if (!hSrc)
  return FALSE;
```

After determining the size of the resource, the resource is loaded into system memory.

```
// Get the size of the paq file.
DWORD rSize = SizeofResource(hMod, hSrc);
// Load the resource
HGLOBAL hRes = LoadResource(hMod, hSrc);
```

If the resource loads successfully (i.e., hRes is not 0), the resource is locked or pinned in memory.

```
// Lock the resource so we can use it
// Returns a pointer to the start of the paq file in memory
LPVOID pRes = LockResource(hRes);
```

Now, the block can be further processed, such as restoring its contents to a destination.

In a preferred embodiment, the contents are first written out to a temporary file.

```
// Create the file for writing the paq file from the resource
tFile = CreateFile(tempPath, GENERIC_WRITE, 0, NULL,
    CREATE_ALWAYS, FILE_ATTRIBUTE_NORMAL, NULL);
// and write the paq file resource to a file.
BOOL wRes = WriteFile(tFile, pRes, rSize, &wLen, NULL);
```

Then, the contents are decompressed or extracted.

```
// Extract all of the files from the temporary paq file
BOOL res = UnpaqArchive (tempPath);
```

Any needed cleanup is performed.

```
CloseHandle (tFile);
remove (tempPath);
```

Once restored to an appropriate destination (e.g., memory or disk storage), the portions can be employed as needed.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for creating a compressed copy of an executable application program, said application program comprising code, data, and resources, the method comprising:

automatically determining portions of the code, data, and resources of the application program which are not immediately required for launching execution of the application program;

compressing said portions of the code, data, and resources determined to be not immediately required for launching execution of the application program; and compressing said application program into itself by storing said compressed portions as a user-defined resource in the application program.

2. The method of claim 1, wherein said application program comprises a Microsoft Windows 16-bit application program having code in one or more code segments and data in one or more data segments.

3. The method of claim 2, wherein portions of the code not immediately required comprise at least one code segment.

4. The method of claim 2, wherein portions of the data not immediately required comprise at least one data segment.

5. The method of claim 1, wherein said resources comprise menus, icons, bitmaps, strings, dialogs, and user-defined resources.

6. The method of claim 1, further comprising:

linking decompression routines into the application program so that said portions which are compressed can be restored at run time from said user-defined resource.

7. The method of claim 1, wherein each of said portions of the code, data, and resources of the application program which are not immediately required for launching execution of the application program is stored separately in said user-defined resource.

8. The method of claim 1, wherein each of said portions of the code, data, and resources of the application program which are not immediately required for launching execution of the application program is stored together as a single unit in said user-defined resource.

9. The method of claim 1, further comprising:

compressing support files into said application program by compressing said support files and storing said compressed support files in said user-defined resource.

10. The method of claim 9, further comprising:

storing directory information in said user-defined resource, so that said support files can be restored to a particular directory structure.

11. In a computer system, a method for creating an installation program, the method comprising:

for a target program comprising code, data, and resources, automatically determining which code, data, and resources are not required during installation of the target program to a new computer system;

compressing said code, data, and resources determined to be not required into a compressed module;

storing said compressed module as a resource in said target program;

linking said target program with code and data for decompressing said compressed module; and executing said target program at said new computer system, whereupon said target program is installed by decompressing said compressed module.

12. The method of claim 11, wherein said target program comprises a segmented application program having code in one or more code segments and data in one or more data segments.

13. The method of claim 12, wherein portions of the code not required comprise at least one code segment.

14. The method of claim 12, wherein portions of the data not required comprise at least one data segment.

15. The method of claim 11, wherein said resources comprise menus, icons, bitmaps, strings, dialogs, and user-defined resources.

16. The method of claim 11, further comprising:

linking decompression routines into the target program so that said portions which are compressed can be restored at runtime from said user-defined resource.

17. The method of claim 11, wherein each of said portions of the code, data, and resources of the target program which are not required is stored separately in said user-defined resource.

18. The method of claim 11, wherein each of said portions of the code, data, and resources of the target program which are not immediately required is stored together as a single unit in said user-defined resource.

19. The method of claim 11, further comprising:

compressing support files into said target program by compressing said support files and storing said compressed support files in said user-defined resource.

20. The method of claim 19, further comprising:

storing directory information in said user-defined resource, so that said support files can be restored to a particular directory structure.

* * * * *